(12) United States Patent
Braedt

(10) Patent No.: US 8,342,994 B2
(45) Date of Patent: Jan. 1, 2013

(54) MULTIPLE SPROCKET ASSEMBLY

(75) Inventor: Henrik Braedt, Würzburg (DE)

(73) Assignee: SRAM Deutschland GmbH (DE)

( * ) Notice: Subject to any disclaimer, the term of this patent is extended or adjusted under 35 U.S.C. 154(b) by 338 days.

(21) Appl. No.: 12/389,743

(22) Filed: Feb. 20, 2009

(65) Prior Publication Data

US 2009/0215565 A1 Aug. 27, 2009

(30) Foreign Application Priority Data

Feb. 23, 2008 (DE) .......................... 10 2008 010 903

(51) Int. Cl.
*F16H 55/30* (2006.01)

(52) U.S. Cl. ....................................................... 474/164

(58) Field of Classification Search .................. 474/158, 474/160, 164, 78
See application file for complete search history.

(56) References Cited

U.S. PATENT DOCUMENTS

| | | | | |
|---|---|---|---|---|
| 3,478,614 A * | 11/1969 | Shimano Keizo | ............ | 474/160 |
| 4,380,445 A | 4/1983 | Shimano | | |
| 4,472,163 A * | 9/1984 | Bottini | ............ | 474/160 |
| 4,642,075 A | 2/1987 | Nagashima | | |
| 4,741,724 A | 5/1988 | Wang | | |
| 5,194,051 A * | 3/1993 | Nagano | ............ | 474/160 |
| 5,503,600 A * | 4/1996 | Berecz | ............ | 474/160 |
| 5,738,603 A * | 4/1998 | Schmidt et al. | ............ | 474/158 |
| 5,762,575 A * | 6/1998 | Vahabzadeh et al. | ........... | 474/78 |
| 5,935,033 A * | 8/1999 | Tseng et al. | ............ | 474/160 |
| 6,142,900 A * | 11/2000 | Takamori | ............ | 474/152 |
| 6,382,381 B1 * | 5/2002 | Okajima et al. | ............ | 192/64 |
| 6,428,437 B1 * | 8/2002 | Schlanger | ............ | 474/160 |
| 7,118,505 B2 * | 10/2006 | Lee | ............ | 474/160 |
| 2003/0064844 A1 | 4/2003 | Lin | | |
| 2004/0259675 A1 * | 12/2004 | Chattin | ............ | 474/160 |
| 2005/0282671 A1 * | 12/2005 | Emura et al. | ............ | 474/160 |
| 2006/0063624 A1 * | 3/2006 | Voss | ............ | 474/78 |
| 2007/0060428 A1 * | 3/2007 | Meggiolan | ............ | 474/160 |
| 2008/0188336 A1 * | 8/2008 | Tokuyama | ............ | 474/160 |
| 2008/0230344 A1 * | 9/2008 | Braedt | ............ | 192/64 |
| 2008/0231014 A1 * | 9/2008 | Braedt | ............ | 280/260 |
| 2008/0234082 A1 * | 9/2008 | Braedt | ............ | 474/116 |
| 2009/0215566 A1 * | 8/2009 | Braedt | ............ | 474/160 |
| 2010/0004081 A1 * | 1/2010 | Braedt | ............ | 474/160 |
| 2010/0075791 A1 * | 3/2010 | Braedt | ............ | 474/160 |

FOREIGN PATENT DOCUMENTS

| | | |
|---|---|---|
| DE | 892 561 | 10/1953 |
| DE | 31 30 258 A1 | 6/1982 |
| DE | 83 18 859 U1 | 11/1983 |
| DE | 36 23 067 A1 | 1/1987 |
| EP | 0 002 964 | 7/1979 |
| EP | 1 074 462 | 2/1987 |

(Continued)

*Primary Examiner* — Thomas B Will
*Assistant Examiner* — Joan D Misa
(74) *Attorney, Agent, or Firm* — Milan Milosevic; Lisa Serdynski; Steven Courtright

(57) ABSTRACT

A multiple sprocket assembly receives a chain and transferring torque therefrom to a rear wheel hub of a bicycle. The multiple sprocket assembly includes a plurality of different-sized, multiple-toothed sprockets arranged coaxially about the rear wheel hub. Each sprocket has a tooth front face facing an adjoining smaller sprocket. A plurality of annular support elements extend between the sprockets, each annular support element including an annular disc having a disc front face facing the adjoining smaller sprocket. The tooth front face of the sprocket has an offset relative to the disc front face of the annular disc.

13 Claims, 1 Drawing Sheet

FOREIGN PATENT DOCUMENTS

| | | |
|---|---|---|
| EP | 03 86 685 A2 | 9/1990 |
| EP | 07 12 780 A1 | 5/1996 |
| GB | 431 528 | 7/1935 |
| GB | 556 492 | 10/1943 |
| GB | 2177628 | 1/1987 |
| WO | WO 2006/034213 | 9/1990 |

* cited by examiner ed sprockets and support elements extending between the sprockets.

Typically, a multiple sprocket assembly or cassette includes a plurality of different-sized sprockets arranged coaxially and mounted on a driver of a wheel hub. The teeth of each rotating sprocket alternately engage a chain to transmit a torque to the driver, the sprockets rotationally coupled to the driver through a profile. Since each individual sprocket transmits torque to the driver, the profile area of the driver and the sprocket are necessarily thick and heavy. To lighten the bicycle for racing purposes, the sprockets are made of lighter materials with openings. However, lighter materials are disadvantaged in regard to hardness, deformation and wear.

SUMMARY OF THE INVENTION

The present invention provides a multiple sprocket assembly mountable to a driver of a rear wheel hub. In one embodiment of the present invention, the multiple sprocket assembly includes two parts mountable to the driver. The first part is a largest sprocket having a profile on its smallest diameter to matingly engage a profile of the driver to rotationally couple the largest sprocket to the driver. The second part is a hollow conical body including a plurality of annular support elements and a plurality of different-sized, multiple-toothed sprocket arranged coaxially about the hub in increasing diameter. The annular support elements are configured in a stepped arrangement to form the hollow conical body. Each annular support element includes an annular cylinder and an annular disc. To maximize strength, the annular cylinder is generally perpendicular to the annular disc. The smallest diameter sprocket of the hollow conical body includes a profile to radially center the hollow conical body against the driver.

Each annular disc includes a disc front face facing an adjoining smaller sprocket. Each sprocket has a tooth front face facing the adjoining smaller sprocket. The tooth front face of the sprocket has an offset relative to the disc front face of the annular disc. The plurality of sprockets and the plurality of annular support elements embody a single piece.

Typically, sprocket teeth will have shifting aids to facilitate shifting of the chain between sprockets, especially when shifting from a smaller sprocket to a larger sprocket wherein features on the sprocket teeth are formed to receive the translating chain. To facilitate shifting, specific teeth are milled narrower on their front face while others are shortened or even removed. In the present invention, the hollow conical body is milled from solid stock permitting thin walls for its annular discs and annular cylinders. To protect the disc front faces from damage during milling, the tooth front face offsets protrude beyond the disc front faces toward the adjoining smaller sprocket. The offset may be at least half the sprocket tooth thickness.

These and other features and advantages of the present invention will be more fully understood from the following description of one or more embodiments of the invention, taken together with the accompanying drawings.

DETAILED DESCRIPTION

Figure 1:
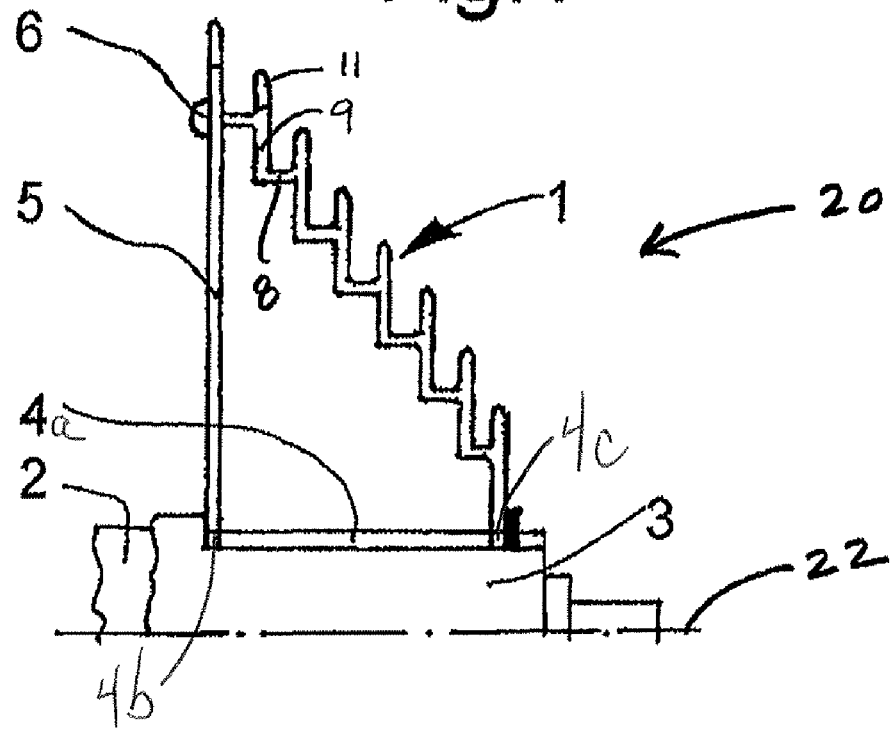
FIG. 1 is a cross-sectional schematic of a multiple sprocket assembly mounted on a driver of a rear wheel hub according to one embodiment of the present invention.
Figure 2:
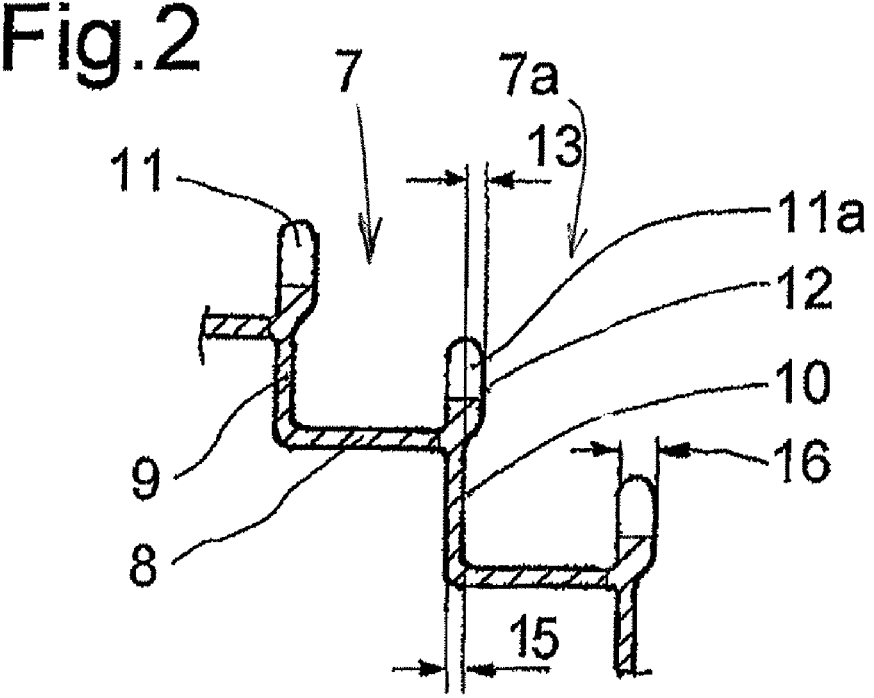
FIG. 2 is a partial cross-sectional view of the multiple sprocket assembly of the present invention.

FIGS. 1 and 2 illustrate a multiple sprocket assembly 20 according to one embodiment of the present invention mounted on a driver 3 of a rear wheel hub 2 of a bicycle. The multiple sprocket assembly 20 includes a largest sprocket 5 and a hollow conical body 1. The largest sprocket 5 is fixedly connected to the hollow conical body 1 by a connection 6, which may be formed by welding, joining, riveting, plugging or the like. The driver 3 includes a profile 4a rotationally coupled to a profile 4b of the largest sprocket. The hollow conical body 1 includes a profile 4c for centering the hollow conical body 1 on the driver 3 of the hub 2. Alternatively, the hollow conical body 1 includes a profile rotationally coupled to the profile 4a of the driver 3.

The hollow conical body 1 includes a plurality of annular support elements 7 and a plurality of different-sized, multiple-toothed sprockets 11 arranged coaxially about the hub 2. Each annular support element 7 includes an annular cylinder 8 and an annular disc 9. The annular disc 9 has a disc front face 10 facing an adjoining smaller sprocket 11a. The annular cylinders 8 extend along a hub axis 22 and have varying diameters. The annular discs 9 extend radially of the hub axis 22 and have varying diameters. The annular cylinders 8 and discs 9 are alternatingly arranged in a stepped sequence to form the hollow conical body 1. The annular support elements 7 and the sprockets 11 embody a single piece. The sprocket 11 has a tooth front face 12 facing the adjoining smaller sprocket 11a. The tooth front face 12 has an offset 13 relative to the disc front face 10, the offset 13 protruding toward the adjoining smaller sprocket 11a. The offset 13 is at least half the sprocket tooth thickness 16. Adjoining annular support elements 7, 7a and the sprockets 11, 11a embody a single piece formed in a stepped arrangement. The offset 13 allows milling operations to be performed on the tooth front face 12 without damaging the wall thickness 15 of the hollow conical body 1. An offset may also be provided on a tooth front face of the largest sprocket 5.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:
1. A multiple sprocket assembly for receiving a chain and transferring torque therefrom to a rear wheel hub of a bicycle, the multiple sprocket assembly comprising:
  a plurality of different-sized multiple-toothed sprockets arranged coaxially about the rear wheel hub, each sprocket having a plurality of teeth, each of the plurality of teeth having a tooth front face facing an adjoining smaller sprocket; and
  a plurality of continuous annular support elements extending between the sprockets, each annular support element including an annular disc having a disc front face facing the adjoining smaller sprocket, the tooth front face hav- ing an offset relative to the disc front face of the annular disc, and wherein each of the annular discs of each of the plurality of annular support elements has a wall thickness which is less than a thickness of the teeth, wherein each annular support element includes an annular cylinder and the annular disc, the sprockets and annular support elements embodying a single piece.

2. The multiple sprocket assembly of claim 1, wherein the offset of the tooth front face protrudes toward the adjoining smaller sprocket.

3. The multiple sprocket assembly of claim 2, wherein the annular support elements are configured in a stepped arrangement to form a hollow conical body.

4. The multiple sprocket assembly of claim 3, wherein the annular cylinder is generally perpendicular to the annular disc.

5. The multiple sprocket assembly of claim 4, wherein the offset is at least half the sprocket tooth thickness.

6. The multiple sprocket assembly of claim 5 further comprising a largest sprocket fixedly connected to the hollow conical body.

7. The multiple sprocket assembly of claim 6, wherein one of the largest sprocket and the hollow conical body is rotationally coupled to the rear wheel hub via a profile.

8. The multiple sprocket assembly of claim 1, wherein the annular cylinder is generally perpendicular to the annular disc.

9. The multiple sprocket assembly of claim 1, wherein the offset of the tooth front face of the sprocket protrudes toward the adjoining smaller sprocket.

10. The multiple sprocket assembly of claim 1, wherein the annular support elements are configured in a stepped arrangement to form a hollow conical body.

11. The multiple sprocket assembly of claim 10 further comprising a largest sprocket fixedly connected to the hollow conical body.

12. The multiple sprocket assembly of claim 11, wherein one of the largest sprocket and the hollow conical body is rotationally coupled to the driver via a profile.

13. The multiple sprocket assembly of claim 1, wherein the offset is at least half the sprocket tooth thickness.

* * * * *